(12) United States Patent
Fu

(10) Patent No.: US 12,581,538 B2
(45) Date of Patent: Mar. 17, 2026

(54) ACCESS METHOD AND APPARATUS FOR UNLICENSED CHANNEL, DEVICE, AND STORAGE MEDIUM

(71) Applicant: BEIJING XIAOMI MOBILE SOFTWARE CO., LTD., Beijing (CN)

(72) Inventor: Ting Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 312 days.

(21) Appl. No.: 18/273,539

(22) PCT Filed: Jan. 21, 2021

(86) PCT No.: PCT/CN2021/073059
§ 371 (c)(1),
(2) Date: Jul. 20, 2023

(87) PCT Pub. No.: WO2022/155840
PCT Pub. Date: Jul. 28, 2022

(65) Prior Publication Data
US 2024/0080893 A1      Mar. 7, 2024

(51) Int. Cl.
*H04W 4/00*          (2018.01)
*H04W 16/14*         (2009.01)
*H04W 74/0816*       (2024.01)

(52) U.S. Cl.
CPC ....... *H04W 74/0816* (2013.01); *H04W 16/14* (2013.01)

(58) Field of Classification Search
CPC .............. H04W 74/0816; H04W 16/14; H04W 74/0808

USPC ................................................... 370/329, 330
See application file for complete search history.

(56) References Cited

U.S. PATENT DOCUMENTS

| | | | |
|---|---|---|---|
| 10,405,250 | B2 | 9/2019 | Li et al. |
| 10,819,486 | B2 | 10/2020 | Yang et al. |
| 2017/0230874 | A1 | 8/2017 | Li et al. |
| 2019/0014596 | A1 | 1/2019 | Yang et al. |
| 2019/0215110 | A1 | 7/2019 | Yang et al. |
| 2020/0205195 | A1 | 6/2020 | Sun et al. |

(Continued)

FOREIGN PATENT DOCUMENTS

| | | |
|---|---|---|
| CN | 104486792 A | 4/2015 |
| CN | 105636108 A | 6/2016 |

(Continued)

OTHER PUBLICATIONS

International Search Report of PCT/CN2021/073059 dated Oct. 20, 2021 with English translation, (4p).

(Continued)

*Primary Examiner* — Chuong T Ho
(74) *Attorney, Agent, or Firm* — Arch & Lake LLp; Hao Tan; Shen Wang

(57) ABSTRACT

An access method for an unlicensed channel includes: determining, by a sender device, an access mode for the unlicensed channel, the access mode includes a first mode or a second mode, the first mode includes an access mode in which listen before talk (LBT) detection is performed, and the second mode includes an access mode in which the LBT detection is not performed; and accessing, by the sender device, the unlicensed channel based on the access mode as determined.

17 Claims, 4 Drawing Sheets determining an access mode for the unlicensed channel, the access mode includes a first mode or a second mode, the first mode includes an access mode in which LBT detection is performed, and the second mode includes an access mode in which the LBT detection is not performed ⟵ S11 accessing the unlicensed channel based on the access mode as determined ⟵ S12

(56) References Cited

U.S. PATENT DOCUMENTS

| | | | | |
|---|---|---|---|---|
| 2020/0267765 | A1 | 8/2020 | Kunt et al. | |
| 2022/0232629 | A1* | 7/2022 | Lin .................... | H04W 74/0808 |
| 2023/0189017 | A1* | 6/2023 | Dong .................... | H04W 16/28 |
| | | | | 370/329 |
| 2023/0361894 | A1* | 11/2023 | Bhamri ................. | H04W 24/10 |
| 2023/0371069 | A1* | 11/2023 | Fu ..................... | H04W 74/0808 |
| 2024/0032098 | A1* | 1/2024 | Ganesan ........... | H04W 74/0816 |

FOREIGN PATENT DOCUMENTS

| | | | |
|---|---|---|---|
| CN | 106559906 | A | 4/2017 |
| CN | 107113801 | A | 8/2017 |
| CN | 107231688 | A | 10/2017 |
| CN | 107294686 | A | 10/2017 |
| CN | 110495242 | A | 11/2019 |
| CN | 110536432 | A | 12/2019 |
| CN | 111699641 | A | 9/2020 |
| EP | 3146781 | A1 | 3/2017 |
| KR | 20170037052 | A | 4/2017 |
| WO | 2016101284 | A1 | 6/2016 |
| WO | 2020172364 | A1 | 8/2020 |

OTHER PUBLICATIONS

First Office Action of Chinese Application No. 202180000240.X dated Feb. 8, 2025, (17p).

Notice of Allowance issued in Chinese Application No. 202180000240.X dated May 30, 2025, (11p).

Qualcomm, "FL Summary for channel access mechanism for 52.6GHz-71GHz band, ver 09", 3GPP TSG RAN WG1 Meeting #103-e, R1-2009724, Oct. 26-Nov. 13, 2020, (115p).

Huawei, "High level consideration on NR unlicensed band operation", 3GPP TSG RAN WG1 NR Ad Hoc Meeting, R1-1711464, Qingdao, China, Jun. 27-30, 2017, (4p).

Quectel, "Discussions on Channel Access Mechanism for NR from 52.6GHz to 71GHz", R1-2004303, 3GPP TSG RAN WG1 #101 e-Meeting, May 25-Jun. 5, 2020, (5p).

* cited by examiner

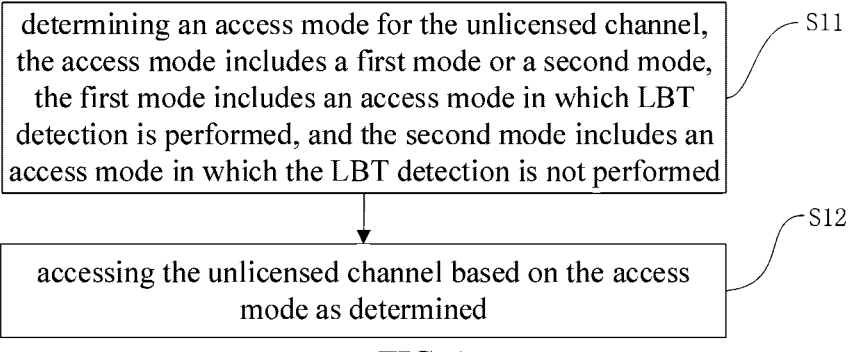

determining an access mode for the unlicensed channel, the access mode includes a first mode or a second mode, the first mode includes an access mode in which LBT detection is performed, and the second mode includes an access mode in which the LBT detection is not performed — S11 accessing the unlicensed channel based on the access mode as determined — S12

FIG. 1

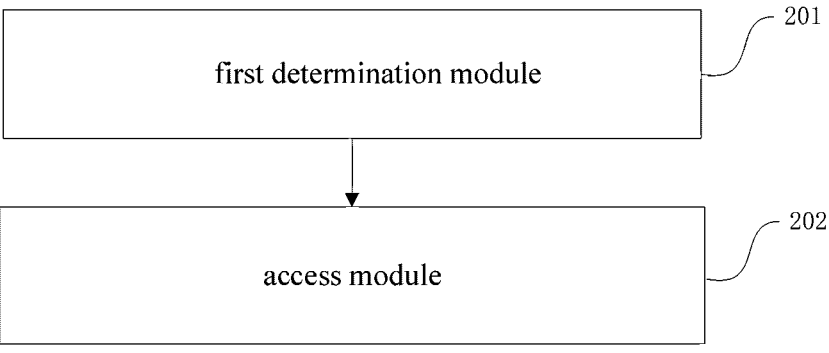

first determination module — 201 access module — 202

FIG. 2

ACCESS METHOD AND APPARATUS FOR UNLICENSED CHANNEL, DEVICE, AND STORAGE MEDIUM

CROSS-REFERENCE TO RELATED APPLICATION

The present application is the U.S. National Stage of International Application No. PCT/CN2021/073059, filed on Jan. 21, 2021, the disclosure of which is incorporated herein by reference in its entirety for all purposes.

BACKGROUND

Radio spectrum resources are limited and non-renewable natural resources, so countries have special management agencies for the radio spectrum, and issued special policies and regulations to realize the unified planning and management of the radio spectrum. Currently, a fixed spectrum allocation strategy is adopted in most spectrum management of various countries, that is, the spectrum resources are managed by government authorities and allocated to fixed authorized users, which can ensure that users avoid excessive mutual interference and make better use of the spectrum resources. Currently, the spectrum resources may be divided into two categories, namely the licensed spectrum and the unlicensed spectrum.

The licensed spectrum is strictly restricted and protected, allowing only authorized users and their devices that conform to the specifications to access. The unlicensed frequency band resources are rich, but in order to guarantee a fair coexistence between different radio access technologies (RATs) using this frequency band, a new technology based on clear channel assessment (CCA) must be introduced.

SUMMARY

The present disclosure relates to the field of wireless communication technologies, and in particular to a method, apparatus, and storage medium for accessing an unlicensed channel.

According to a first aspect of the present disclosure, an access method for an unlicensed channel is provided. The access method is applied to a sender device, and includes determining an access mode for the unlicensed channel, the access mode comprising a first mode or a second mode. The first mode includes an access mode in which listen before talk (LBT) detection is performed, and the second mode includes an access mode in which the LBT detection is not performed. The method further includes accessing the unlicensed channel based on the access mode as determined.

According to a second aspect of the present disclosure, an access method for an unlicensed channel is provided. The access method is applied to a receiver device, and includes: determining a second parameter used for indicating receiver channel interference; and sending the second parameter used for indicating the receiver channel interference to a sender device, causing the sender device to determine, based on the second parameter used for indicating the receiver channel interference, an access mode for the unlicensed channel, the access mode includes a first mode or a second mode, the first mode includes an access mode in which listen before talk (LBT) detection is performed, and the second mode includes an access mode in which the LBT detection is not performed.

According to a third aspect of the present disclosure, a mobile device is provided. The device includes: a processor;

and a memory, configured to store an executable instruction executable by the processor; the processor, through executing the executable instruction in the memory, is configured to implement the steps of the access method described above.

According to a fourth aspect of the present disclosure, a non-transitory computer-readable storage medium is provided. The storage medium stores an executable instruction, and the executable instruction, when executed by a processor, implements the steps of the access method described above.

It should be understood that the above general description and the later detailed description are only examples and explanations and do not limit the present disclosure.

BRIEF DESCRIPTION OF THE DRAWINGS

The accompanying drawings illustrated herein are used to provide further understanding of the examples of the present disclosure and form part of the present disclosure, and the schematic examples of the present disclosure and their descriptions are used to explain the examples of the present disclosure and do not constitute an undue limitation of the examples of the present disclosure.

The accompanying drawings herein are incorporated into and form part of the specification, illustrate the examples consistent with the present disclosure, and are used with the specification to explain the principles of the examples of the present disclosure.

FIG. 1 is a flow diagram of an access method for an unlicensed channel illustrated according to one example of the present disclosure.

FIG. 2 is a structure diagram of an access apparatus for an unlicensed channel illustrated according to one example of the present disclosure.

DETAILED DESCRIPTION

Figure 3:
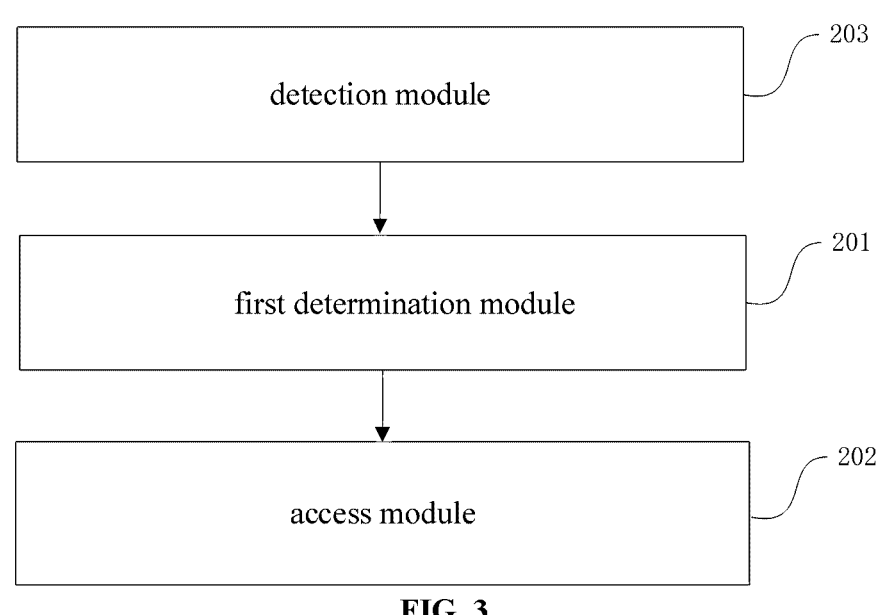
FIG. 3 is a structure diagram of an access apparatus for an unlicensed channel illustrated according to one example of the present disclosure.

The examples of the present disclosure are further described in conjunction with the accompanying drawings and detailed description. Where the following description relates to the accompanying drawings, unless otherwise indicated, the same numerals in different accompanying drawings indicate the same or similar elements. The examples described in the following examples do not represent all examples that are consistent with the examples of the present disclosure. Rather, the described examples are only examples of apparatus and methods that are consistent with some aspects of the present disclosure, as detailed in the appended claims.

A sender device may use an LBT mechanism, also referred to as an access mode in which listen before talk (LBT) detection is performed, and specifically, the sender device performs the LBT detection first and then accesses the unlicensed channel.

Due to the high signal attenuation of the high frequency channel, after the sender device accesses the high frequency unlicensed channel, the interference between sender devices may be relatively small even if the distance between the sender devices is close. Therefore, a no-LBT mechanism, also referred to as an access mode in which the LBT detection is not performed, is proposed, and specifically, the sender device may directly access the unlicensed channel without performing the LBT detection before accessing the unlicensed channel. It is necessary to provide a solution for how the sender device determines the access mode. The present disclosure provides an access method for an unlicensed channel. This method is applied to a sender device. The sender device and the receiver device in the present disclosure may be various devices such as user devices, base stations, core network devices, network-side devices, and the like.

FIG. 1 is a flow diagram of an access method for an unlicensed channel illustrated according to one example. As shown in FIG. 1, the access method includes steps S11 to S12.

At step S11, an access mode for the unlicensed channel is determined, the access mode includes a first mode or a second mode, the first mode includes an access mode in which LBT detection is performed, and the second mode includes an access mode in which the LBT detection is not performed.

At step S12, the unlicensed channel is accessed based on the access mode as determined. In the example of the present disclosure, two access modes for the unlicensed channel is provided for the sender device, enabling the sender device to use different access modes in different application scenarios, improving the flexibility of the access of the sender device, and saving the processing power of the sender device in some application scenarios.

One example of the present disclosure provides an access method for an unlicensed channel. This method is applied to the sender device, and includes: determining the access mode for the unlicensed channel based on a first parameter used for indicating sender channel interference, the access mode includes a first mode or a second mode, the first mode includes an access mode in which the LBT detection is performed, and the second mode includes an access mode in which the LBT detection is not performed; and accessing the unlicensed channel based on the access mode as determined.

In one example, the first parameter used for indicating the sender channel interference is determined by the sender device through performing at least one channel interference measurement on the unlicensed channel and based on a measurement result of the at least one channel interference measurement.

In one example, in response to a first parameter used for indicating sender channel interference being greater than or equal to a first threshold, it is determined that the access mode for the unlicensed channel is the first mode. In response to the first parameter used for indicating the sender channel interference being less than the first threshold, it is determined that the access mode for the unlicensed channel is the second mode.

In one example, in response to a first parameter used for indicating sender channel interference being greater than a first threshold, it is determined that the access mode for the unlicensed channel is the first mode. In response to the first parameter used for indicating the sender channel interference being less than or equal to the first threshold, it is determined that the access mode for the unlicensed channel is the second mode.

In one example, determining, based on the first parameter used for indicating the sender channel interference the access mode for the unlicensed channel includes: determining, based on the first parameter used for indicating the sender channel interference, the access mode, for the unlicensed channel, in a first set duration. Specifically, after the access mode for the unlicensed channel is determined based on the first parameter used for indicating the sender channel interference, the access mode is used during the first set duration. After the first set duration ends, the access mode for the unlicensed channel is redetermined. In this example, the sender device obtains at least one channel interference measurement result by performing one or more channel interference measurements, and determines, based on the at least one channel interference measurement result, the first parameter used for indicating the sender channel interference; and the sender device determines the access mode based on the first parameter used for indicating the sender channel interference, and uses the access mode in the subsequent first set duration without the need to perform the channel interference measurement before each access, which can save the processing power of the sender device.

One example of the present disclosure provides an access method for an unlicensed channel. This method is applied to a sender device, and includes: determining the access mode for the unlicensed channel based on a second parameter used for indicating receiver channel interference, the access mode includes a first mode or a second mode, the first mode includes an access mode in which the LBT detection is performed, and the second mode includes an access mode in which the LBT detection is not performed; and accessing the unlicensed channel based on the access mode as determined.

In one example, the sender device receives at least one channel interference measurement result from the receiver device, and determines, based on the at least one channel interference measurement result, the second parameter used for indicating the receiver channel interference. In this example, the at least one channel interference measurement result is obtained by the receiver device through performing at least one channel interference measurement on the unlicensed channel.

In one example, in response to a second parameter used for indicating receiver channel interference being greater than or equal to a second threshold, it is determined that the access mode for the unlicensed channel is the first mode. In response to the second parameter used for indicating the receiver channel interference being less than the second threshold, it is determined that the access mode for the unlicensed channel is the second mode.

In one example, in response to a second parameter used for indicating receiver channel interference being greater than a second threshold, it is determined that the access mode for the unlicensed channel is the first mode. In response to the second parameter used for indicating the receiver channel interference being less than or equal to the second threshold, it is determined that the access mode for the unlicensed channel is the second mode.

In one example, determining, based on the second parameter used for indicating the receiver channel interference, the access mode for the unlicensed channel includes: determining, based on the second parameter used for indicating the receiver channel interference, the access mode, for the unlicensed channel, in a second set duration. Specifically, after the access mode for the unlicensed channel is determined based on the second parameter used for indicating the receiver channel interference, the access mode is used during the second set duration. After the second set duration ends, the access mode for the unlicensed channel is redetermined. In this example, the sender device receives at least one channel interference measurement result from the receiver device, and determines, based on the at least one channel interference measurement result, the second parameter used for indicating the receiver channel interference; and after determining, based on the second parameter used for indicating the receiver channel interference, the access mode for the unlicensed channel, the sender device uses the access mode in the subsequent second set duration without the need to receive the channel interference measurement result from the receiver device before each access, which can save the wireless transmission power.

One example of the present disclosure provides an access method for an unlicensed channel. This method is applied to a sender device, and includes: determining the access mode for the unlicensed channel based on a first parameter used for indicating sender channel interference and a second parameter used for indicating receiver channel interference, the access mode includes a first mode or a second mode, the first mode includes an access mode in which the LBT detection is performed, and the second mode includes an access mode in which the LBT detection is not performed; and accessing the unlicensed channel based on the access mode as determined.

In one example, the first parameter used for indicating the sender channel interference is determined by the sender device through performing at least one channel interference measurement on the unlicensed channel and based on a measurement result of the at least one channel interference measurement.

The sender device receives at least one channel interference measurement result from the receiver device, and determines, based on the at least one channel interference measurement result, the second parameter used for indicating the receiver channel interference. In this example, the at least one channel interference measurement result is obtained by the receiver device through performing at least one channel interference measurement on the unlicensed channel.

In one example, in response to a first parameter used for indicating sender channel interference being greater than or equal to a first threshold, and a second parameter used for indicating receiver channel interference being greater than or equal to a second threshold, it is determined that the access mode for the unlicensed channel is the first mode. In response to the first parameter used for indicating the sender channel interference being less than the first threshold, and the second parameter used for indicating the receiver channel interference being less than the second threshold, it is determined that the access mode for the unlicensed channel is the second mode.

In one example, in response to a first parameter used for indicating sender channel interference being greater than a first threshold, and a second parameter used for indicating receiver channel interference being greater than a second threshold, it is determined that the access mode for the unlicensed channel is the first mode. In response to the first parameter used for indicating the sender channel interference being less than or equal to the first threshold, and the second parameter used for indicating the receiver channel interference being less than or equal to the second threshold, it is determined that the access mode for the unlicensed channel is the second mode.

In one example, the determining, based on the first parameter used for indicating the sender channel interference and the second parameter used for indicating the receiver channel interference, the access mode for the unlicensed channel includes: determining, based on the first parameter used for indicating the sender channel interference and the second parameter used for indicating the receiver channel interference, the access mode, for the unlicensed channel, in a third set duration. Specifically, after the access mode for the unlicensed channel is determined based on the first parameter used for indicating the sender channel interference and the second parameter used for indicating the receiver channel interference, the access mode is used during the third set duration. After the third set duration ends, the access mode for the unlicensed channel is redetermined. In this example, the sender device obtains at least one channel interference measurement result after performing one or more channel interference measurements, and determines, based on the at least one channel interference measurement result, the first parameter used for indicating the sender channel interference; the sender device receives at least one channel interference measurement result from the receiver device, and determines, based on the at least one channel interference measurement result, the second parameter used for indicating the receiver channel interference; and then the sender device uses the access mode in the subsequent third set duration without the need to perform the channel interference measurement or receive the channel interference measurement result from the receiver device before each access, which can save the processing power and the wireless transmission power.

One example of the present disclosure provides an access method for an unlicensed channel. This method is applied to a sender device, and includes: determining, based on a first parameter used for indicating sender channel interference, a switching to the access mode for the unlicensed channel, the access mode includes a first mode or a second mode, the first mode includes an access mode in which the LBT detection is performed, and the second mode includes an access mode in which the LBT detection is not performed; and accessing the unlicensed channel based on the access mode after the switching. Determining the switching to the access mode for the unlicensed channel includes: switching the second mode to the first mode, or switching the first mode to the second mode.

One example of the present disclosure provides an access method for an unlicensed channel. This method is applied to a sender device, and includes: determining, based on a second parameter used for indicating receiver channel interference, a switching to the access mode for the unlicensed channel, the access mode includes a first mode or a second mode, the first mode includes an access mode in which the LBT detection is performed, and the second mode includes an access mode in which the LBT detection is not performed; and accessing the unlicensed channel based on the access mode after the switching. Determining the switching to the access mode for the unlicensed channel includes: switching the second mode to the first mode, or switching the first mode to the second mode.

One example of the present disclosure provides an access method for an unlicensed channel. This method is applied to a sender device, and includes: determining, based on a first parameter used for indicating sender channel interference and a second parameter used for indicating receiver channel interference, a switching to the access mode for the unlicensed channel, the access mode includes a first mode or a second mode, the first mode includes an access mode in which the LBT detection is performed, and the second mode includes an access mode in which the LBT detection is not performed; and accessing the unlicensed channel based on the access mode after the switching. Determining the switching to the access mode for the unlicensed channel includes: switching the second mode to the first mode, or switching the first mode to the second mode.

One example of the present disclosure provides an access method for an unlicensed channel. This method is applied to a sender device, and includes: determining, based on a first parameter used for indicating sender channel interference, that the access mode for the unlicensed channel is switched from the second mode to the first mode, the access mode includes a first mode or a second mode, the first mode includes an access mode in which the LBT detection is performed, and the second mode includes an access mode in which the LBT detection is not performed; and accessing the unlicensed channel based on the first mode.

In one example, the first parameter used for indicating the sender channel interference is determined by the sender device through performing at least one channel interference measurement on the unlicensed channel and based on a measurement result of the at least one channel interference measurement. In response to a first parameter used for indicating sender channel interference being greater than or equal to a first threshold, it is determined that the access mode for the unlicensed channel is switched from the second mode to the first mode.

In one example, the access mode for the unlicensed channel is the second mode, the first parameter used for indicating the sender channel interference is determined, and in response to the first parameter used for indicating the sender channel interference being greater than the first threshold, it is determined that the access mode for the unlicensed channel is switched from the second mode to the first mode.

One example of the present disclosure provides an access method for an unlicensed channel. This method is applied to a sender device, and includes: determining, based on a second parameter used for indicating receiver channel interference, that the access mode for the unlicensed channel is switched from the second mode to the first mode, the access mode includes a first mode or a second mode, the first mode includes an access mode in which the LBT detection is performed, and the second mode includes an access mode in which the LBT detection is not performed; and accessing the unlicensed channel based on the first mode.

In one example, the sender device receives at least one channel interference measurement result from the receiver device, and determines, based on the at least one channel interference measurement result, the second parameter used for indicating the receiver channel interference. In this example, the at least one channel interference measurement result is obtained by the receiver device through performing at least one channel interference measurement on the unlicensed channel.

In one example, in response to a second parameter used for indicating receiver channel interference being greater than or equal to a second threshold, it is determined that the access mode for the unlicensed channel is switched from the second mode to the first mode.

In one example, the access mode for the unlicensed channel is the second mode, the second parameter used for indicating the receiver channel interference is determined, and in response to the second parameter used for indicating the receiver channel interference being greater than the second threshold, it is determined that the access mode for the unlicensed channel is switched from the second mode to the first mode.

One example of the present disclosure provides an access method for an unlicensed channel. This method is applied to a sender device, and includes: determining, based on a first parameter used for indicating sender channel interference and a second parameter used for indicating receiver channel interference, that the access mode for the unlicensed channel is switched from the second mode to the first mode, the access mode includes a first mode or a second mode, the first mode includes an access mode in which the LBT detection is performed, and the second mode includes an access mode in which the LBT detection is not performed; and accessing the unlicensed channel based on the first mode.

In one example, the first parameter used for indicating the sender channel interference is determined by the sender device through performing at least one channel interference measurement on the unlicensed channel and based on a measurement result of the at least one channel interference measurement.

The sender device receives at least one channel interference measurement result from the receiver device, and determines, based on the at least one channel interference measurement result, the second parameter used for indicating the receiver channel interference. In this example, the at least one channel interference measurement result is obtained by the receiver device through performing at least one channel interference measurement on the unlicensed channel.

In one example, it is determined that the access mode for the unlicensed channel is switched from the second mode to the first mode in response to: a first parameter used for indicating sender channel interference being greater than or equal to a first threshold, and/or a second parameter used for indicating receiver channel interference being greater than or equal to a second threshold.

In one example, it is determined that the access mode for the unlicensed channel is switched from the second mode to the first mode in response to: a first parameter used for indicating sender channel interference being greater than a first threshold, and a second parameter used for indicating receiver channel interference being greater than a second threshold.

In one example, the access mode for the unlicensed channel is the second mode, the first parameter used for indicating the sender channel interference and the second parameter used for indicating the receiver channel interference are determined, and it is determined that the access mode for the unlicensed channel is switched from the second mode to the first mode in response to: the first parameter used for indicating the sender channel interference being greater than the first threshold, and the second parameter used for indicating the receiver channel interference being greater than the second threshold.

In one example, in response to a first parameter used for indicating sender channel interference being greater than or equal to a first threshold, it is determined that the access mode for the unlicensed channel is switched from the second mode to the first mode.

In one example, in response to a second parameter used for indicating receiver channel interference being greater than or equal to a second threshold, it is determined that the access mode for the unlicensed channel is switched from the second mode to the first mode.

One example of the present disclosure provides an access method for an unlicensed channel. This method is applied to a sender device, and includes: determining, based on a first parameter used for indicating sender channel interference, that the access mode for the unlicensed channel is switched from the first mode to the second mode, the access mode includes a first mode or a second mode, the first mode includes an access mode in which the LBT detection is performed, and the second mode includes an access mode in which the LBT detection is not performed; and accessing the unlicensed channel based on the second mode.

In one example, the first parameter used for indicating the sender channel interference is determined by the sender device through performing at least one channel interference measurement on the unlicensed channel and based on a measurement result of the at least one channel interference measurement.

In one example, in response to a first parameter used for indicating sender channel interference being less than or equal to a first threshold, it is determined that the access mode for the unlicensed channel is switched from the first mode to the second mode.

In one example, the access mode for the unlicensed channel is the first mode, the first parameter used for indicating the sender channel interference is determined, and in response to the first parameter used for indicating the sender channel interference being less than the first threshold, it is determined that the access mode for the unlicensed channel is switched from the first mode to the second mode.

One example of the present disclosure provides an access method for an unlicensed channel. This method is applied to a sender device, and includes: determining, based on a second parameter used for indicating receiver channel interference, that the access mode for the unlicensed channel is switched from the first mode to the second mode, the access mode includes a first mode or a second mode, the first mode includes an access mode in which the LBT detection is performed, and the second mode includes an access mode in which the LBT detection is not performed; and accessing the unlicensed channel based on the second mode.

In one example, the sender device receives at least one channel interference measurement result from the receiver device, and determines, based on the at least one channel interference measurement result, the second parameter used for indicating the receiver channel interference. In this example, the at least one channel interference measurement result is obtained by the receiver device through performing at least one channel interference measurement on the unlicensed channel.

In one example, in response to a second parameter used for indicating receiver channel interference being less than or equal to a second threshold, it is determined that the access mode for the unlicensed channel is switched from the first mode to the second mode.

In one example, the access mode for the unlicensed channel is the first mode, the second parameter used for indicating the receiver channel interference is determined, and in response to the second parameter used for indicating the receiver channel interference being less than the second threshold, it is determined that the access mode for the unlicensed channel is switched from the first mode to the second mode.

One example of the present disclosure provides an access method for an unlicensed channel. This method is applied to a sender device, and includes: determining, based on a first parameter used for indicating sender channel interference and a second parameter used for indicating receiver channel interference, that the access mode for the unlicensed channel is switched from the first mode to the second mode, the access mode includes a first mode or a second mode, the first mode includes an access mode in which the LBT detection is performed, and the second mode includes an access mode in which the LBT detection is not performed; and accessing the unlicensed channel based on the second mode.

In one example, the first parameter used for indicating the sender channel interference is determined by the sender device through performing at least one channel interference measurement on the unlicensed channel and based on a measurement result of the at least one channel interference measurement.

The sender device receives at least one channel interference measurement result from the receiver device, and determines, based on the at least one channel interference measurement result, the second parameter used for indicating the receiver channel interference. In this example, the at least one channel interference measurement result is obtained by the receiver device through performing at least one channel interference measurement on the unlicensed channel.

In one example, it is determined that the access mode for the unlicensed channel is switched from the first mode to the second mode in response to: a first parameter used for indicating sender channel interference being less than or equal to a first threshold, and/or a second parameter used for indicating receiver channel interference being less than or equal to a second threshold.

In one example, it is determined that the access mode for the unlicensed channel is switched from the first mode to the second mode in response to: a first parameter used for indicating sender channel interference being less than or equal to a first threshold, and a second parameter used for indicating receiver channel interference being less than or equal to a second threshold.

In one example, the access mode for the unlicensed channel is the first mode, the first parameter used for indicating the sender channel interference and the second parameter used for indicating the receiver channel interference are determined, and it is determined that the access mode for the unlicensed channel is switched from the first mode to the second mode in response to: the first parameter used for indicating the sender channel interference being less than the first threshold, and the second parameter used for indicating the receiver channel interference being less than the second threshold.

In one example, in response to a first parameter used for indicating sender channel interference being less than or equal to a first threshold, it is determined that the access mode for the unlicensed channel is switched from the first mode to the second mode.

In one example, in response to a second parameter used for indicating receiver channel interference being less than or equal to a second threshold, it is determined that the access mode for the unlicensed channel is switched from the first mode to the second mode.

One example of the present disclosure provides an access method for an unlicensed channel. This method is applied to a sender device, and includes: performing at least one channel interference measurement on the unlicensed channel; and determining, based on a measurement result of the at least one channel interference measurement, the first parameter used for indicating the sender channel interference; determining the access mode for the unlicensed channel based on the first parameter used for indicating the sender channel interference, the access mode includes a first mode or a second mode, the first mode includes an access mode in which the LBT detection is performed, and the second mode includes an access mode in which the LBT detection is not performed; and accessing the unlicensed channel based on the access mode as determined.

One example of the present disclosure provides an access method for an unlicensed channel. This method is applied to a sender device, and includes: receiving at least one channel interference measurement result from a receiver device; and determining the second parameter used for indicating the receiver channel interference based on the at least one channel interference measurement result, the at least one channel interference measurement result is obtained by the receiver device through performing at least one channel interference measurement on the unlicensed channel; determining the access mode for the unlicensed channel based on the second parameter used for indicating the receiver channel interference, the access mode includes a first mode or a second mode, the first mode includes an access mode in which the LBT detection is performed, and the second mode includes an access mode in which the LBT detection is not performed; and accessing the unlicensed channel based on the access mode as determined.

One example of the present disclosure provides an access method for an unlicensed channel. This method is applied to a sender device, and includes: performing at least one channel interference measurement on the unlicensed channel; and determining, based on a measurement result of the at least one channel interference measurement, the first parameter used for indicating the sender channel interference; receiving at least one channel interference measurement result from a receiver device; and determining the second parameter used for indicating the receiver channel interference based on the at least one channel interference measurement result, the at least one channel interference measurement result is obtained by the receiver device through performing at least one channel interference measurement on the unlicensed channel; determining the access mode for the unlicensed channel based on the first parameter used for indicating the sender channel interference and the second parameter used for indicating the receiver channel interference, the access mode includes a first mode or a second mode, the first mode includes an access mode in which the LBT detection is performed, and the second mode includes an access mode in which the LBT detection is not performed; and accessing the unlicensed channel based on the access mode as determined.

One example of the present disclosure provides an access method for an unlicensed channel. This method is applied to a sender device, and includes: performing at least one channel interference measurement on the unlicensed channel; and determining, based on a measurement result of the at least one channel interference measurement, the first parameter used for indicating the sender channel interference; determining, based on the first parameter used for indicating the sender channel interference, that the access mode for the unlicensed channel is switched from the second mode to the first mode, the access mode includes a first mode or a second mode, the first mode includes an access mode in which the LBT detection is performed, and the second mode includes an access mode in which the LBT detection is not performed; and accessing the unlicensed channel based on the first mode.

One example of the present disclosure provides an access method for an unlicensed channel. This method is applied to a sender device, and includes: receiving at least one channel interference measurement result from a receiver device; and determining the second parameter used for indicating the receiver channel interference based on the at least one channel interference measurement result, the at least one channel interference measurement result is obtained by the receiver device through performing at least one channel interference measurement on the unlicensed channel; determining, based on the second parameter used for indicating the receiver channel interference, that the access mode for the unlicensed channel is switched from the second mode to the first mode, the access mode includes a first mode or a second mode, the first mode includes an access mode in which the LBT detection is performed, and the second mode includes an access mode in which the LBT detection is not performed; and accessing the unlicensed channel based on the first mode.

One example of the present disclosure provides an access method for an unlicensed channel. This method is applied to a sender device, and includes: performing at least one channel interference measurement on the unlicensed channel; and determining, based on a measurement result of the at least one channel interference measurement, the first parameter used for indicating the sender channel interference; receiving at least one channel interference measurement result from a receiver device; and determining the second parameter used for indicating the receiver channel interference based on the at least one channel interference measurement result, the at least one channel interference measurement result is obtained by the receiver device through performing at least one channel interference measurement on the unlicensed channel; determining, based on the first parameter used for indicating the sender channel interference and the second parameter used for indicating the receiver channel interference, that the access mode for the unlicensed channel is switched from the second mode to the first mode, the access mode includes a first mode or a second mode, the first mode includes an access mode in which the LBT detection is performed, and the second mode includes an access mode in which the LBT detection is not performed; and accessing the unlicensed channel based on the first mode.

One example of the present disclosure provides an access method for an unlicensed channel. This method is applied to a sender device, and includes: performing at least one channel interference measurement on the unlicensed channel; and determining, based on a measurement result of the at least one channel interference measurement, the first parameter used for indicating the sender channel interference; determining, based on the first parameter used for indicating the sender channel interference, that the access mode for the unlicensed channel is switched from the first mode to the second mode, the access mode includes a first mode or a second mode, the first mode includes an access mode in which the LBT detection is performed, and the second mode includes an access mode in which the LBT detection is not performed; and accessing the unlicensed channel based on the second mode.

One example of the present disclosure provides an access method for an unlicensed channel. This method is applied to a sender device, and includes: receiving at least one channel interference measurement result from a receiver device; and determining the second parameter used for indicating the receiver channel interference based on the at least one channel interference measurement result, the at least one channel interference measurement result is obtained by the receiver device through performing at least one channel interference measurement on the unlicensed channel; determining, based on the second parameter used for indicating the receiver channel interference, that the access mode for the unlicensed channel is switched from the first mode to the second mode, the access mode includes a first mode or a second mode, the first mode includes an access mode in which the LBT detection is performed, and the second mode includes an access mode in which the LBT detection is not performed; and accessing the unlicensed channel based on the second mode.

One example of the present disclosure provides an access method for an unlicensed channel. This method is applied to a sender device, and includes: performing at least one channel interference measurement on the unlicensed channel; and determining, based on a measurement result of the at least one channel interference measurement, the first parameter used for indicating the sender channel interference; receiving at least one channel interference measurement result from a receiver device; and determining the second parameter used for indicating the receiver channel interference based on the at least one channel interference measurement result, the at least one channel interference measurement result is obtained by the receiver device through performing at least one channel interference measurement on the unlicensed channel; determining, based on the first parameter used for indicating the sender channel interference and the second parameter used for indicating the receiver channel interference, that the access mode for the unlicensed channel is switched from the first mode to the second mode, the access mode includes a first mode or a second mode, the first mode includes an access mode in which the LBT detection is performed, and the second mode includes an access mode in which the LBT detection is not performed; and accessing the unlicensed channel based on the second mode.

One example of the present disclosure provides an access method for an unlicensed channel. This method is applied to a receiver device, and includes: determining a second parameter used for indicating receiver channel interference; and sending the second parameter used for indicating the receiver channel interference to a sender device, causing the sender device to determine, based on the second parameter used for indicating the receiver channel interference, an access mode for the unlicensed channel, the access mode includes a first mode or a second mode, the first mode includes an access mode in which the LBT detection is performed, and the second mode includes an access mode in which the LBT detection is not performed.

One example of the present disclosure provides an access method for an unlicensed channel. This method is applied to a receiver device, and includes: obtaining at least one channel interference measurement result by performing at least one channel interference measurement on the unlicensed channel; determining, based on the at least one channel interference measurement result, the second parameter used for indicating the receiver channel interference; and sending the second parameter used for indicating the receiver channel interference to a sender device, causing the sender device to determine, based on the second parameter used for indicating the receiver channel interference, an access mode for the unlicensed channel, the access mode includes a first mode or a second mode, the first mode includes an access mode in which the LBT detection is performed, and the second mode includes an access mode in which the LBT detection is not performed.

One example of the present disclosure provides an access apparatus for an unlicensed channel. This access apparatus is applied to a sender device, and is configured to implement any one of the above method examples applied to the sender device. Referring to FIG. 2, FIG. 2 is a structure diagram of an access apparatus for an unlicensed channel illustrated according to one example. As shown in FIG. 2, the access apparatus includes: a first determination module 201, configured to determine an access mode for the unlicensed channel, the access mode includes a first mode or a second mode, the first mode includes an access mode in which the LBT detection is performed, and the second mode includes an access mode in which the LBT detection is not performed; and an access module 202, configured to access the unlicensed channel based on the access mode as determined.

One example of the present disclosure provides an access apparatus for an unlicensed channel. This access apparatus is applied to a sender device, and is configured to implement any one of the above method examples applied to the sender device. The access apparatus includes: a first determination module 201, configured to determine an access mode for the unlicensed channel based on at least one of a first parameter used for indicating sender channel interference or a second parameter used for indicating receiver channel interference; the first mode includes an access mode in which the LBT detection is performed, and the second mode includes an access mode in which the LBT detection is not performed; and an access module 202, configured to access the unlicensed channel based on the access mode as determined.

One example of the present disclosure provides an access apparatus for an unlicensed channel. This access apparatus is applied to a sender device, and is configured to implement any one of the above method examples applied to the sender device. The access apparatus includes: a first determination module 201, configured to determine, based on at least one of a first parameter used for indicating sender channel interference or a second parameter used for indicating receiver channel interference, a switching to the access mode for the unlicensed channel; the first mode includes an access mode in which the LBT detection is performed, and the second mode includes an access mode in which the LBT detection is not performed; and an access module 202, configured to access the unlicensed channel based on the access mode after the switching.

One example of the present disclosure provides an access apparatus for an unlicensed channel. This access apparatus is applied to a sender device, and is configured to implement any one of the above method examples applied to the sender device. The access apparatus includes: a first determination module 201, configured to determine that the access mode for the unlicensed channel is the first mode in response to at least one of: a first parameter used for indicating sender channel interference being greater than or equal to a first threshold, or a second parameter used for indicating receiver channel interference being greater than or equal to a second threshold; and the first mode includes an access mode in which the LBT detection is performed; and an access module 202, configured to access the unlicensed channel based on the first mode.

One example of the present disclosure provides an access apparatus for an unlicensed channel. This access apparatus is applied to a sender device, and is configured to implement any one of the above method examples applied to the sender device. The access apparatus includes: a first determination module 201, configured to determine that the access mode for the unlicensed channel is switched from the second mode to the first mode in response to at least one of: a first parameter used for indicating sender channel interference being greater than or equal to a first threshold, or a second parameter used for indicating receiver channel interference being greater than or equal to a second threshold; the first mode includes an access mode in which the LBT detection is performed, and the second mode includes an access mode in which the LBT detection is not performed; and an access module 202, configured to access the unlicensed channel based on the first mode.

One example of the present disclosure provides an access apparatus for an unlicensed channel. This access apparatus is applied to a sender device, and is configured to implement any one of the above method examples applied to the sender device. The access apparatus includes: a first determination module 201, configured to determine that the access mode for the unlicensed channel is the second mode in response to at least one of: a first parameter used for indicating sender channel interference being less than or equal to a first threshold, or a second parameter used for indicating receiver channel interference being less than or equal to a second threshold; and the second mode includes an access mode in which the LBT detection is not performed; and an access module 202, configured to access the unlicensed channel based on the second mode.

One example of the present disclosure provides an access apparatus for an unlicensed channel. This access apparatus is applied to a sender device, and is configured to implement any one of the above method examples applied to the sender device. The access apparatus includes: a first determination module 201, configured to determine that the access mode for the unlicensed channel is switched from the first mode to the second mode in response to at least one of: a first parameter used for indicating sender channel interference being less than or equal to a first threshold, or a second parameter used for indicating receiver channel interference being less than or equal to a second threshold; the first mode includes an access mode in which the LBT detection is performed, and the second mode includes an access mode in which the LBT detection is not performed; and an access module 202, configured to access the unlicensed channel based on the second mode.

One example of the present disclosure provides an access apparatus for an unlicensed channel. This access apparatus is applied to a sender device, and is configured to implement any one of the above method examples applied to the sender device. Referring to FIG. 3, FIG. 3 is a structure diagram of an access apparatus for an unlicensed channel illustrated according to one example. As shown in FIG. 3, the access apparatus includes: a detection module 203, configured to perform at least one channel interference measurement on the unlicensed channel, and determine, based on a measurement result of the at least one channel interference measurement, the first parameter used for indicating the sender channel interference; a first determination module 201, configured to determine, based on the first parameter used for indicating the sender channel interference, the access mode for the unlicensed channel or that the second mode is switched to the first mode, or that the first mode is switched to the second mode; the first mode includes an access mode in which the LBT detection is performed, and the second mode includes an access mode in which the LBT detection is not performed; and an access module 202, configured to access the unlicensed channel based on the access mode as determined.

Figure 4:
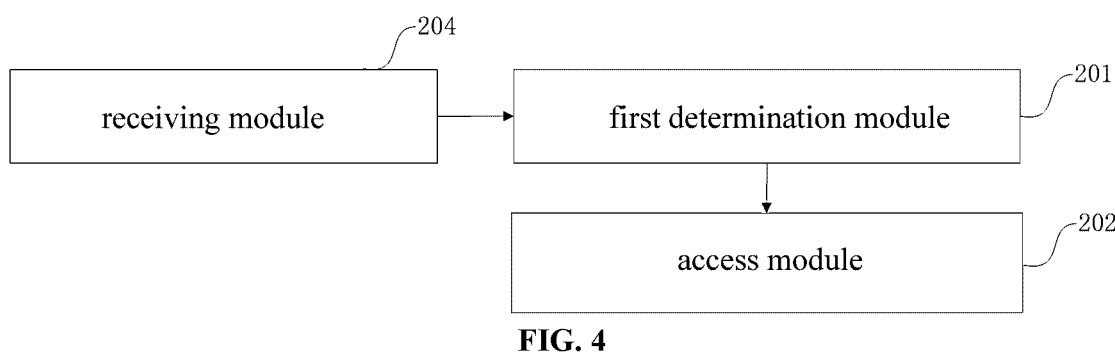
FIG. 4 is a structure diagram of an access apparatus for an unlicensed channel illustrated according to one example of the present disclosure.

One example of the present disclosure provides an access apparatus for an unlicensed channel. This access apparatus is applied to a sender device, and is configured to implement any one of the above method examples applied to the sender device. Referring to FIG. 4, FIG. 4 is a structure diagram of an access apparatus for an unlicensed channel illustrated according to one example. As shown in FIG. 4, the access apparatus includes: a receiving module 204, configured to receive at least one channel interference measurement result from a receiver device, and determine the second parameter used for indicating the receiver channel interference based on the at least one channel interference measurement result; and the at least one channel interference measurement result is obtained by the receiver device through performing at least one channel interference measurement on the unlicensed channel; a first determination module 201, configured to determine, based on the second parameter used for indicating the receiver channel interference, the access mode for the unlicensed channel or that the second mode is switched to the first mode, or that the first mode is switched to the second mode; the first mode includes an access mode in which the LBT detection is performed, and the second mode includes an access mode in which the LBT detection is not performed; and an access module 202, configured to access the unlicensed channel based on the access mode as determined.

Figure 5:
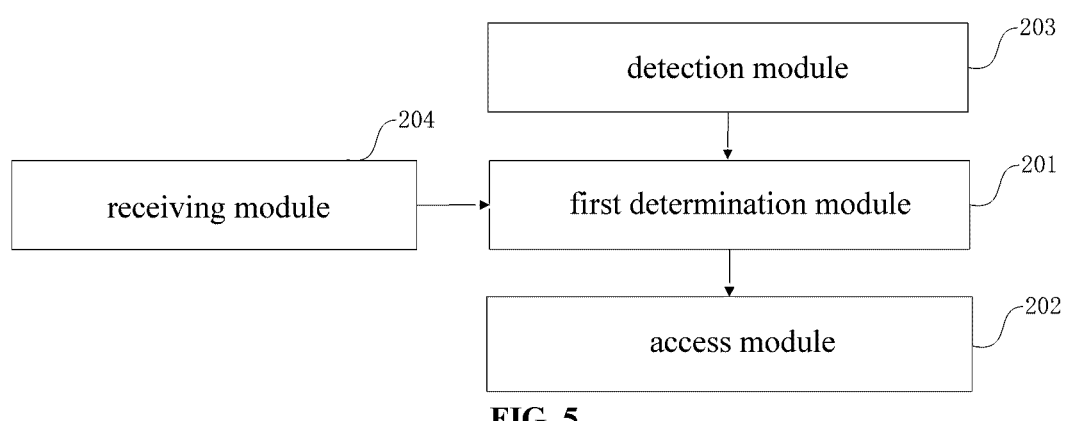
FIG. 5 is a structure diagram of an access apparatus for an unlicensed channel illustrated according to one example of the present disclosure.

One example of the present disclosure provides an access apparatus for an unlicensed channel. This access apparatus is applied to a sender device, and is configured to implement any one of the above method examples applied to the sender device. Referring to FIG. 5, FIG. 5 is a structure diagram of an access apparatus for an unlicensed channel illustrated according to one example. As shown in FIG. 5, the access apparatus includes: a detection module 203, configured to perform at least one channel interference measurement on the unlicensed channel, and determine, based on a measurement result of the at least one channel interference measurement, the first parameter used for indicating the sender channel interference; a receiving module 204, configured to receive at least one channel interference measurement result from a receiver device, and determine the second parameter used for indicating the receiver channel interference based on the at least one channel interference measurement result; and the at least one channel interference measurement result is obtained by the receiver device through performing at least one channel interference measurement on the unlicensed channel; a first determination module 201, configured to determine, based on the first parameter used for indicating the sender channel interference and the second parameter used for indicating the receiver channel interference, the access mode for the unlicensed channel or that the second mode is switched to the first mode, or that the first mode is switched to the second mode; the first mode includes an access mode in which the LBT detection is performed, and the second mode includes an access mode in which the LBT detection is not performed; and an access module 202, configured to access the unlicensed channel based on the access mode as determined.

One example of the present disclosure provides an access apparatus for an unlicensed channel. This access apparatus is applied to a receiver device, and is configured to implement any one of the above method examples applied to the receiver device. The access apparatus includes: a second determination module, configured to determine a second parameter used for indicating receiver channel interference; and a sending module, configured to send the second parameter used for indicating the receiver channel interference to a sender device, causing the sender device to determine, based on the second parameter used for indicating the receiver channel interference, an access mode for the unlicensed channel; the access mode includes a first mode or a second mode, the first mode includes an access mode in which the LBT detection is performed, and the second mode includes an access mode in which the LBT detection is not performed.

One example of the present disclosure provides an access apparatus for an unlicensed channel. This access apparatus is applied to a receiver device, and is configured to implement any one of the above method examples applied to the receiver device. The access apparatus includes: a measurement module, configured to obtain at least one channel interference measurement result by performing at least one channel interference measurement on the unlicensed channel; and a second determination module, configured to determine, based on the at least one channel interference measurement result, a second parameter used for indicating receiver channel interference; and a sending module, configured to send the second parameter used for indicating the receiver channel interference to a sender device, causing the sender device to determine, based on the second parameter used for indicating the receiver channel interference, an access mode for the unlicensed channel; the access mode includes a first mode or a second mode, the first mode includes an access mode in which the LBT detection is performed, and the second mode includes an access mode in which the LBT detection is not performed.

One example of the present disclosure provides a mobile device. The mobile device includes: a processor; and a memory, configured to store an executable instruction executable by the processor. In this example, the processor, through executing the executable instruction in the memory, is configured to implement the steps of the access method described above.

One example of the present disclosure provides a non-transitory computer-readable storage medium. The storage medium stores an executable instruction, and the executable instruction, when executed by a processor, implements the steps of the access method described above.

Figure 6:
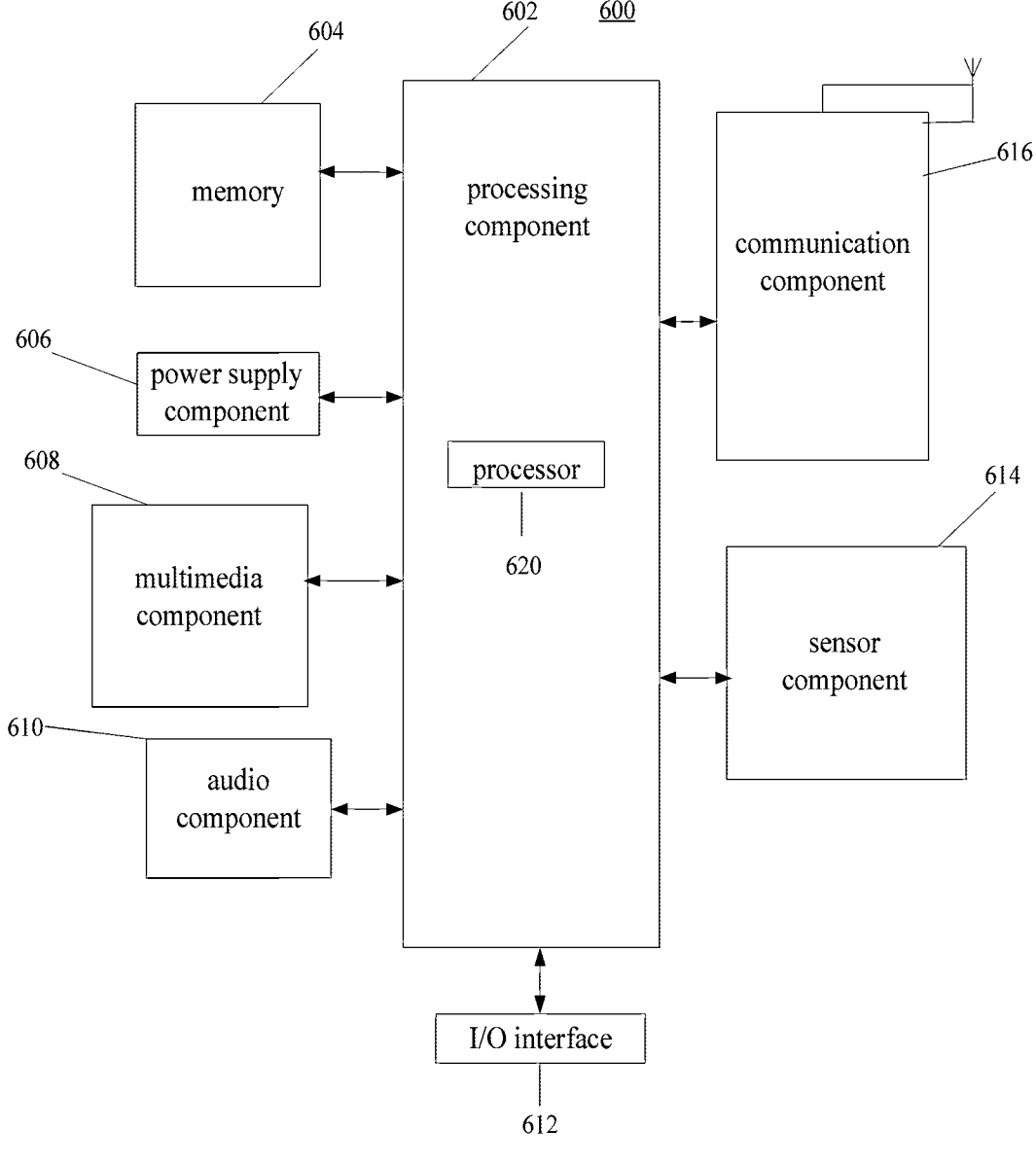
FIG. 6 is a block diagram of an access apparatus for an unlicensed channel illustrated according to one example of the present disclosure.

FIG. 6 is a block diagram of an access apparatus 600 for an unlicensed channel illustrated according to one example. For example, the access apparatus 600 may be a cell phone, a computer, a digital broadcast terminal, a message sending and receiving device, a gaming console, a tablet device, a medical device, a fitness device, a personal digital assistant, etc.

Referring to FIG. 6, the access apparatus 600 may include one or more of the following components: a processing component 602, a memory 604, a power supply component 606, a multimedia component 608, an audio component 610, an input/output (I/O) interface 612, a sensor component 614, and a communication component 616.

The processing component 602 generally controls the overall operation of the access apparatus 600, such as operations associated with display, telephone calls, data communication, camera operations, and recording operations. The processing component 602 may include one or more processors 620 to execute an instruction to complete all or some of the steps of the method described above. In addition, the processing component 602 may include one or more modules that facilitate interaction between the processing component 602 and other components. For example, the processing component 602 may include a multimedia module to facilitate interaction between the multimedia component 608 and the processing component 602.

The memory 604 is configured to store various types of data to support the operations at the access apparatus 600. Examples of such data include the following for any application or method to operate on the access apparatus 600: instructions, contact data, phonebook data, messages, pictures, videos, etc. The memory 604 may be implemented by any type of volatile or non-volatile storage device or a combination thereof, such as a static random access memory (SRAM), electrically erasable programmable read-only memory (EEPROM), erasable programmable read-only memory (EPROM), programmable read-only memory (PROM), read-only memory (ROM), magnetic memory, flash memory, disk or CD-ROM.

The power supply component 606 supplies power to various components of the access apparatus 600. The power supply component 606 may include a power supply management system, one or more power supplies, and other components associated with generating, managing, and distributing power for the access apparatus 600.

The multimedia component 608 includes a screen that provides an output interface between the access apparatus 600 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some examples, the multimedia component 608 includes a front-facing camera and/or a rear-facing camera. The front-facing camera and/or the rear-facing camera may receive external multimedia data when the access apparatus 600 is in an operating mode, such as a shooting mode or a video mode. Each of the front-facing camera and the rear-facing camera may be a fixed optical lens system or have a focal length and optical zoom capability.

The audio component 610 is configured to output and/or input audio signals. For example, the audio component 610 includes a microphone (MIC), configured to receive external audio signals when the access apparatus 600 is in an operating mode, such as a call mode, a recording mode, and a voice recognition mode. The received audio signals may be further stored in the memory 604 or sent via the communication component 616. In some examples, the audio component 610 further includes a speaker for outputting the audio signals.

The I/O interface 612 provides an interface between the processing component 602 and a peripheral interface module, and the peripheral interface module may be a keypad, a click wheel, a button, etc. These buttons may include, but are not limited to, a home button, a volume button, a start button, and a lock button.

The sensor component 614 includes one or more sensors, used for providing a status assessment of various aspects of the access apparatus 600. For example, the sensor component 614 may detect an open/closed state of the access apparatus 600, relative positioning of the component, for example, the component is the display and keypad of the access apparatus 600, the sensor component 614 may also detect a change in the position of the access apparatus 600 or a change in the position of one component of the access apparatus 600, the presence or absence of user contact with the access apparatus 600, the orientation or acceleration/deceleration of the access apparatus 600, and temperature changes of the access apparatus 600. The sensor component 614 may include a proximity sensor, configured to detect the presence of nearby objects in the absence of any physical contact. The sensor component 614 may also include a light sensor, such as a CMOS or CCD image sensor, for use in imaging applications. In some examples, the sensor component 614 may also include an accelerometer sensor, a gyroscope sensor, a magnetic sensor, a pressure sensor, or a temperature sensor.

The communication component 616 is configured to facilitate the communication between the access apparatus 600 and other devices by wired or wireless means. The access apparatus 600 may access a wireless network based on a communication standard, such as Wi-Fi, 2G, 3G or a combination thereof. In one example, the communication component 616 receives broadcast signals or broadcast-related information from an external broadcast management system via a broadcast channel. In an example, the communication component 616 further includes a near-field communication (NFC) module to facilitate short-range communication. For example, the NFC module may be implemented based on radio frequency identification (RFID) technology, infrared data association (IrDA) technology, ultra-wideband (UWB) technology, bluetooth (BT) technology, and other technologies.

In one example, the access apparatus 600 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic elements, and configured to perform the above method.

In one example, a non-transitory computer-readable storage medium including an instruction is provided, such as a memory 604 including an instruction. The instruction described above is capable of being executed by the one or more processors 620 of the access apparatus 600 to complete the above method. For example, the non-transitory computer-readable storage medium may be a ROM, a random access memory (RAM), a CD-ROM, a magnetic tape, a floppy disk, an optical data storage device, etc.

Figure 7:
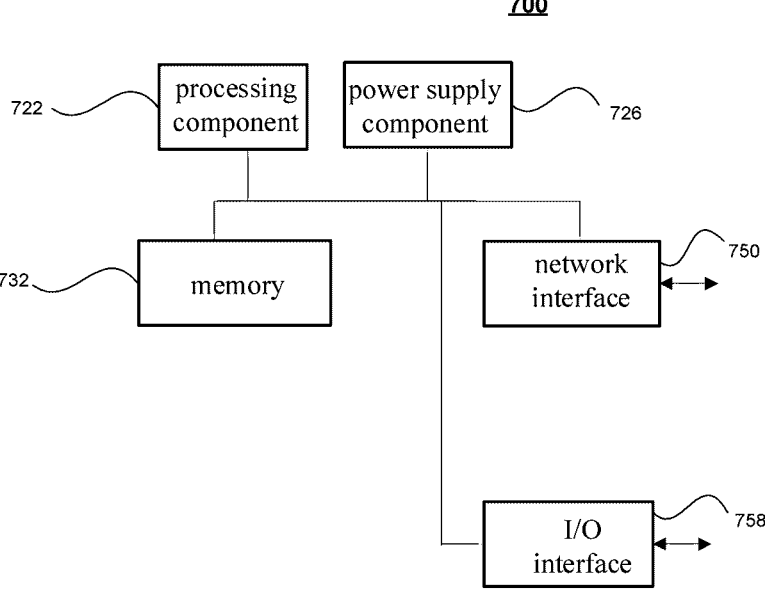
FIG. 7 is a block diagram of an access apparatus for an unlicensed channel illustrated according to one example of the present disclosure.

FIG. 7 is a block diagram of an access apparatus 700 for an unlicensed channel illustrated according to one example. For example, the access apparatus 700 may be provided as a base station. Referring to FIG. 7, the access apparatus 700 includes a processing component 722. The processing component 722 further includes: one or more processors, and memory resources represented by a memory 732 and used for storing an instruction, such as an application program, which is executable by the processing component 722. The application program stored in the memory 732 may include one or more modules, and each module corresponds to a set of the instruction. In addition, the processing component 722 is configured to execute the instruction to implement the access method for the unlicensed channel described above.

The access apparatus 700 may also include a power supply component 726 configured to perform power management of the access apparatus 700, a wired or wireless network interface 750 configured to connect the access apparatus 700 to a network, and an input/output (I/O) interface 758. The access apparatus 700 may operate an operating system stored in the memory 732, such as Windows Server™, Mac OS X™, Unix™, Linux™, FreeBSD™, or the like.

According to a first example of the present disclosure, an access method for an unlicensed channel is provided. The access method is applied to a sender device, and includes: determining an access mode for the unlicensed channel, the access mode includes a first mode or a second mode, the first mode includes an access mode in which listen before talk (LBT) detection is performed, and the second mode includes an access mode in which the LBT detection is not performed; and accessing the unlicensed channel based on the access mode as determined.

In one example, the determining the access mode for the unlicensed channel includes: determining the access mode for the unlicensed channel based on at least one of a first parameter used for indicating sender channel interference or a second parameter used for indicating receiver channel interference.

In one example, the determining the access mode for the unlicensed channel includes: determining that the access mode is the first mode or that the second mode is switched to the first mode in response to at least one of: a first parameter used for indicating sender channel interference being greater than or equal to a first threshold, or a second parameter used for indicating receiver channel interference being greater than or equal to a second threshold.

In one example, the determining the access mode for the unlicensed channel includes: determining that the access mode is the second mode or that the first mode is switched to the second mode in response to at least one of: a first parameter used for indicating sender channel interference being less than or equal to a first threshold, or a second parameter used for indicating receiver channel interference being less than or equal to a second threshold.

In one example, the access method further includes: performing at least one channel interference measurement on the unlicensed channel; and determining, based on a measurement result of the at least one channel interference measurement, the first parameter used for indicating the sender channel interference.

In one example, the access method further includes: receiving at least one channel interference measurement result from a receiver device; and determining the second parameter used for indicating the receiver channel interference based on the at least one channel interference measurement result, the at least one channel interference measurement result is obtained by the receiver device through performing at least one channel interference measurement on the unlicensed channel.

According to a second example of the present disclosure, an access method for an unlicensed channel is provided. The access method is applied to a receiver device, and includes: determining a second parameter used for indicating receiver channel interference; and sending the second parameter used for indicating the receiver channel interference to a sender device, causing the sender device to determine, based on the second parameter used for indicating the receiver channel interference, an access mode for the unlicensed channel, the access mode includes a first mode or a second mode, the first mode includes an access mode in which listen before talk (LBT) detection is performed, and the second mode includes an access mode in which the LBT detection is not performed.

In one example, the access method further includes: obtaining at least one channel interference measurement result by performing at least one channel interference measurement on the unlicensed channel; the determining the second parameter used for indicating the receiver channel interference includes: determining, based on the at least one channel interference measurement result, the second parameter used for indicating the receiver channel interference.

According to a third example of the present disclosure, an access apparatus for an unlicensed channel is provided. The access apparatus is applied to a sender device, and includes: a first determination module, configured to determine an access mode for the unlicensed channel, the access mode includes a first mode or a second mode, the first mode includes an access mode in which listen before talk (LBT) detection is performed, and the second mode includes an access mode in which the LBT detection is not performed; and an access module, configured to access the unlicensed channel based on the access mode as determined.

In one example, the first determination module is further configured to determine the access mode for the unlicensed channel based on at least one of a first parameter used for indicating sender channel interference or a second parameter used for indicating receiver channel interference.

According to a fourth example of the present disclosure, an access apparatus for an unlicensed channel is provided. The access apparatus is applied to a receiver device, and includes: a second determination module, configured to determine a second parameter used for indicating receiver channel interference; and a sending module, configured to send the second parameter used for indicating the receiver channel interference to a sender device, causing the sender device to determine, based on the second parameter used for indicating the receiver channel interference, an access mode for the unlicensed channel, the access mode includes a first mode or a second mode, the first mode includes an access mode in which listen before talk (LBT) detection is performed, and the second mode includes an access mode in which the LBT detection is not performed.

According to a fifth example of the present disclosure, a mobile device is provided. The device includes: a processor; and a memory, configured to store an executable instruction executable by the processor; the processor, through executing the executable instruction in the memory, is configured to implement the steps of the access method described above.

According to a sixth example of the present disclosure, a non-transitory computer-readable storage medium is provided. The storage medium stores an executable instruction, and the executable instruction, when executed by a processor, implements the steps of the access method described above.

The technical solutions provided in the examples of the present disclosure may include the following beneficial effects: providing, for the sender device, two access modes for the unlicensed channel, enabling the sender device to use different access modes in different application scenarios, improving the flexibility of the access of the sender device, and saving the processing power of the sender device in some application scenarios.

After considering the specification and practicing the examples of the present disclosure, those skilled in the art will easily come up with other examples of the present disclosure. The purpose of the present disclosure is to cover any variations, uses, or adaptations of the present disclosure, which follow the general principles of the present disclosure and include common knowledge or commonly used technical means in the technical field that are not disclosed in the present disclosure. The specification and examples are only considered to be examples, and the true scope and spirit of the present disclosure are indicated by the following claims.

It should be understood that the examples of the present disclosure are not limited to the precise structure already described above and shown in the accompanying drawings, and various modifications and changes may be made without departing from the scope of the present disclosure. The scope of the present disclosure is limited only by the accompanying claims.

INDUSTRIAL UTILITY

Two access modes for the unlicensed channel is provided for the sender device, enabling the sender device to use different access modes in different application scenarios, improving the flexibility of the access of the sender device, and saving the processing power of the sender device in some application scenarios.

What is claimed is:

1. An access method for an unlicensed channel, comprising:

determining, by a sender device, an access mode for the unlicensed channel, wherein the access mode comprises a first mode or a second mode, the first mode comprises an access mode in which a listen before talk (LBT) detection is performed, and the second mode comprises an access mode in which the LBT detection is not performed; and accessing, by the sender device, the unlicensed channel based on the access mode as determined, wherein determining the access mode for the unlicensed channel comprises:

determining that the access mode is the first mode or that the second mode is switched to the first mode in response to at least one of followings:

a first parameter used for indicating sender channel interference being greater than or equal to a first threshold, or a second parameter used for indicating receiver channel interference being greater than or equal to a second threshold.

2. The method according to claim 1, wherein determining the access mode for the unlicensed channel comprises:

determining, based on at least one of the first parameter or the second parameter, the access mode for the unlicensed channel.

3. The method according to claim 2, further comprising:

performing at least one channel interference measurement on the unlicensed channel; and determining the first parameter based on a result of the at least one channel interference measurement.

4. The method according to claim 2, further comprising:

receiving at least one channel interference measurement result from a receiver device; and determining the second parameter based on the at least one channel interference measurement result, wherein the at least one channel interference measurement result is obtained by the receiver device through performing at least one channel interference measurement on the unlicensed channel.

5. The method according to claim 1, wherein determining the access mode for the unlicensed channel comprises:

determining, based on at least one of the first parameter or the second parameter, a switching to the access mode for the unlicensed channel; and accessing the unlicensed channel based on the access mode as determined comprises:

accessing the unlicensed channel based on the access mode after the switching.

6. The method according to claim 1, wherein determining the access mode for the unlicensed channel comprises:

determining that the access mode is the second mode or that the first mode is switched to the second mode in response to at least one of:

the first parameter being less than the first threshold, or the second parameter being less than the second threshold.

7. A non-transitory computer-readable storage medium, storing an executable instruction, wherein the executable instruction, when executed by a processor, implements the steps of the access method according to claim 1.

8. An access method for an unlicensed channel, comprising:

determining, by a receiver device, a parameter used for indicating receiver channel interference; and sending, by the receiver device, to a sender device the parameter used for indicating the receiver channel interference, causing the sender device to determine, based on the parameter used for indicating the receiver channel interference, an access mode for the unlicensed channel, wherein the access mode comprises a first mode or a second mode, the first mode comprises an access mode in which listen before talk (LBT) detection is performed, and the second mode comprises an access mode in which the LBT detection is not performed, wherein the sender device determines that the access mode is the first mode or that the second mode is switched to the first mode in response to at least one of followings:

a parameter used for indicating sender channel interference being greater than or equal to a first threshold, or the parameter used for indicating the receiver channel interference being greater than or equal to a second threshold.

9. The method according to claim 8, further comprising:

obtaining at least one channel interference measurement result by performing at least one channel interference measurement on the unlicensed channel; wherein determining the parameter used for indicating the receiver channel interference comprises:

determining the parameter used for indicating the receiver channel interference based on the at least one channel interference measurement result.

10. A mobile device, comprising:

a processor; and a memory, configured to store an executable instruction; wherein the processor, through executing the executable instruction in the memory, is configured to implement the steps of the access method according to claim 8.

11. A non-transitory computer-readable storage medium, storing an executable instruction, wherein the executable instruction, when executed by a processor, implements the steps of the access method according to claim 8.

12. A mobile device, comprising:

a processor; and a memory, configured to store an executable instruction; wherein the processor, through executing the executable instruction in the memory, is configured to:

determine an access mode for an unlicensed channel, wherein the access mode comprises a first mode or a second mode, the first mode comprises an access mode in which listen before talk (LBT) detection is performed, and the second mode comprises an access mode in which the LBT detection is not performed; and access the unlicensed channel based on the access mode as determined; wherein the processor is specifically configured to determine that the access mode is the first mode or that the second mode is switched to the first mode in response to at least one of followings:

a first parameter used for indicating sender channel interference being greater than or equal to a first threshold, or a second parameter used for indicating receiver channel interference being greater than or equal to a second threshold.

13. The mobile device according to claim 12, wherein the processor is specifically configured to determine, based on at least one of the first parameter or the second parameter, the access mode for the unlicensed channel.

14. The mobile device according to claim 13, wherein the processor is further configured to:

perform at least one channel interference measurement on the unlicensed channel; and determine the first parameter based on a result of the at least one channel interference measurement.

15. The mobile device according to claim 13, wherein the processor is further configured to:

receive at least one channel interference measurement result from a receiver device; and determine the second parameter based on the at least one channel interference measurement result, wherein the at least one channel interference measurement result is obtained by the receiver device through performing at least one channel interference measurement on the unlicensed channel.

16. The mobile device according to claim 12, wherein the processor is specifically configured to:

determine, based on at least one of the first parameter or the second parameter, a switching to the access mode for the unlicensed channel; and access the unlicensed channel based on the access mode after the switching.

17. The mobile device according to claim 12, wherein the processor is specifically configured to determine that the access mode is the second mode or that the first mode is switched to the second mode in response to at least one of:

the first parameter being less than the first threshold, or the second parameter being less than the second threshold.

* * * * *